United States Patent
Espenschied

Patent Number: 5,957,263
Date of Patent: Sep. 28, 1999

[54] APPARATUS FOR CORRECTING FOR WEAR OF A CONVEYOR BELT

[75] Inventor: Kenneth S. Espenschied, Westlake, Ohio

[73] Assignee: Advanced Robotic Technologies, Inc., Cleveland, Ohio

[21] Appl. No.: 08/931,200

[22] Filed: Sep. 16, 1997

Related U.S. Application Data

[60] Provisional application No. 60/027,106, Sep. 25, 1996.

[51] Int. Cl.$^6$ .................................................. B65G 43/08
[52] U.S. Cl. .................. 198/349.95; 198/502.3; 198/810.01
[58] Field of Search ........................ 198/349.95, 810.01, 198/810.02, 502.3

[56] References Cited

U.S. PATENT DOCUMENTS 4,198,758  4/1980  Eineichner et al. ............... 198/349.95

*Primary Examiner*—William E. Terrell
*Assistant Examiner*—Mark Deuble
*Attorney, Agent, or Firm*—Ware, Fressola, Van der Sluys & Adolphson LLP

[57] ABSTRACT

An apparatus and method for correcting for wear of links of a conveyor belt, resulting in inaccurate triggering based, on encoder pulses, of events downstream from a part registration sensor. The wear causes lengthening of the links, which the invention measures in an average sense and to within an accuracy limited by the rate of encoder pulses. An adaptive trigger then uses an inferred, approximate length for each link to refigure when to trigger downstream events.

1 Claim, 2 Drawing Sheets

APPARATUS FOR CORRECTING FOR
WEAR OF A CONVEYOR BELT

This application claims priority based on provisional application Ser. No. 60/027,106 filed Sep. 25, 1996.

TECHNICAL FIELD

The present invention is an apparatus and method that pertains to the field of triggering events on a conveyor, and more particularly, adjusting when to trigger an event because of lengthening of the links of a chain-type conveyor over time.

BACKGROUND OF THE INVENTION

In a manufacturing system using a conveyor, it is often necessary to cause some event to occur when a part on the conveyor reaches some point on the conveyor track. One method is to install a part registration sensor (e.g., a photo-eye or proximity switch) where the event is to occur. This, however, is not always feasible due to hostile environments, the desire to trigger multiple events from one registration sensor, or the need for variable trigger points. Whenever an event must be triggered downstream from a part registration sensor, an encoder attached to the line can be used to track the object, and the event triggered based on this encoder tracking.

In a conveyor driven by a chain, an encoder is typically coupled to the chain by a sprocket meshing with the chain. The encoder therefore delivers a fixed number of pulses per revolution, and thus a fixed number of pulses per link, a number that is the same for each link regardless of how the length may vary from one link to the next. In fact, due to manufacturing tolerances and wear, not all links are the same in length. For example, a 4.5 m section of chain of a chain-on-edge conveyor, having perhaps 30 links each approximately 15 cm long, may in fact be kept in service until the same 30 links actually measure 4.57 m in length. Furthermore, a section of damaged or excessively worn chain may be replaced with new chain, while the surrounding chain is still moderately worn, resulting in nominal link lengths that vary significantly from one section of chain to another. Thus, if a downstream event is to be triggered by the tracking of a part based on the number of encoder pulses since the part was registered, the trigger point for an event that is to occur 4.5 m downstream, which would be 30 links not accounting for wear, will in fact occur 7 cm further downstream. Though this discrepancy may be reduced by placing the part registration closer to the downstream event, doing that is often too expensive or just not feasible. What is needed is a process of measuring the wear of the conveyor, and correcting for it, to enable accurate remote triggering.

DISCLOSURE OF THE INVENTION

An object of the present invention is to dynamically adapt to wear of a chain-type conveyor causing individual links of the conveyor to lengthen.

According to the present invention, this object is achieved by continually assigning and storing, for each link between the registration point and the farthest downstream trigger point, an assigned length, which is approximately an average link length for an upstream measurement segment, and adding to this assigned length a correction to account for a tracking encoder having limited resolution because of its generating a finite number of pulses per link of the conveyor. The present invention thus significantly reduces error caused by chain wear and inconsistency in link length.

One aspect of the present invention is an adaptive trigger for correcting for wear of a conveyor, comprising:
a) two wear sensors positioned along the conveyor to span a measurement segment of the conveyor, each wear sensor responsive to passage of a link, each for providing a pulse separated in time by a phase lag when a link passes;
b) a link measuring device, responsive to the pulses from each wear sensor, for providing an assigned link length signal for a last link in the measurement segment, the assigned link length equal to the total length of the measurement segment divided by the number of lnks in the measurement segment, inferred from the pulses from the two wear sensors; and
c) a trigger, responsive to the assigned link length signal the last link in the measurement segment, for storing the assigned link length signal for that link and for all other links in a trigger segment between a part registration sensor and a downstream triggering point, responsive to a signal from a part registration sensor indicating when the part is at the beginning of the trigger segement, and responsive to pulses from an encoder occurring at a fixed number per link, for providing a trigger signal for a downstream event enabler based on the most recent assigned link lengths, a stored nominal distance the conveyor travels between pulses of the encoder, and the stored length of the triggering segment, thereby continually adapting the trigger signal, by virtue of continual updates to the stored assigned link lengths, to account for wear of the conveyor.

Another aspect of the present invention is a method using an encoder coupled to a conveyor, for adapting when to trigger an event on the conveyor at a location at one end of a trigger segment, the other end at the location of a part registration sensor, comprising the steps of:
a) recording, as fixed values, a nominal link length, a number of encoder pulses per link, a nominal distance the conveyor travels between encoder pulses, and the length of the trigger segment;
b) assigning, continually, an assigned length to a last link in a measurement segment of some fixed length, the assigned length equal to an average link length for the segment, the number of links in the segment determined based on wear sensors at either end of the segment;
c) storing a last assigned link length for each link on the conveyor between the part registration sensor and the location at the distance downstream; and
d) figuring after how many encoder pulses to trigger the event based on the most recently recorded assigned link lengths for the links of the trigger segment, the recorded number of encoder pulses per link, the nominal distance traveled by the conveyor per encoder pulse and the stored length of the trigger segment.

BRIEF DESCRIPTION OF THE DRAWINGS

An embodiment of the present invention is described by way of example with reference to the accompanying drawing, in which.

BEST MODE FOR CARRYING OUT THE INVENTION

Figure 1:
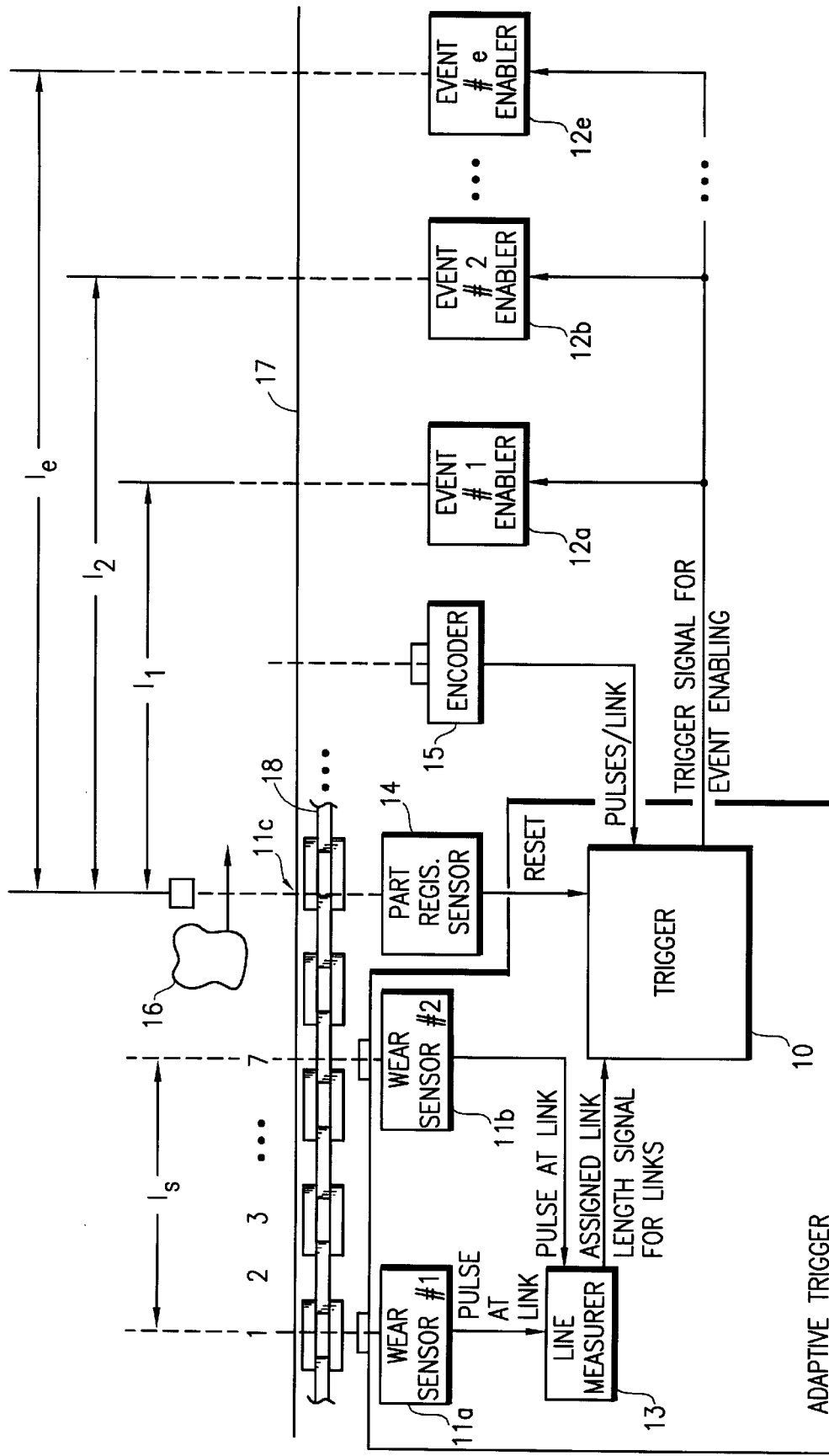
FIG. 1 is a block diagram showing elements according to the present invention.

Referring now to FIG. 1, according to the present invention, an adaptive trigger 20 accounts for wear in a chain-type conveyor 17 using two wear sensors 11a and 11b to monitor the passage of chain links 18. Each wear sensor is responsive to passage of a link at its location. These wear sensors can be optical type sensors, proximity sensors, or other kinds of sensors. They are separated by a distance $l_s$ sufficient to give a desired accuracy in triggering downstream events; this distance depends on a distance from a part registration point 11c to a last trigger point, where a last event enabler 12c is stationed, after, possibly, other event enablers 12a and 12b.

Based on the separation $l_s$ of the two wear sensors 11a, 11b and a nominal link length, there will be an expected phase-lag between pulses generated by the two wear sensors 11a and 11b. The difference between the actual lag and the expected lag is a measure of the total stretch in a segment of chain called here the measurement segment, spanned by the wear sensors. Based on the signals from the wear sensors, a link measurer 13 determines the number of links in the measurement segment and divides the total stretch for this segment by this number of links, to yield an average stretch per link of that segment, which it assigns to the link in the measurement segment that is closest to a downstream part registration sensor 14. The link measurer 13 continually assigns a recalculated length to each link passing between the wear sensors, thus accounting for continued stretch in the conveyor. The last assigned length is held in the adaptive trigger 10 for each link between the part registration sensor and the most downstream trigger point.

Thus, although the actual length of each link is not measured in the preferred embodiment of the present invention, each link i is assigned a measured length $m_i$ equal to the average length of a link in the measurement segment. If the measurement segment spans s links, taking as s the whole number of links spanned, the assigned length for the i link is $$m_i = \frac{1}{s}\sum_{j=o}^{s-1} l_{i+j}$$

where $l_i$ is the actual (unknown and unmeasured) length of link i.

To correct for chain wear, the adaptive trigger determines how many pulses from an encoder 15 it should receive before triggering, based on how far downstream the event to be triggered is located, and on the continually changing assigned link lengths, which amount to continually changing lengths between encoder pulses.

Figure 2:
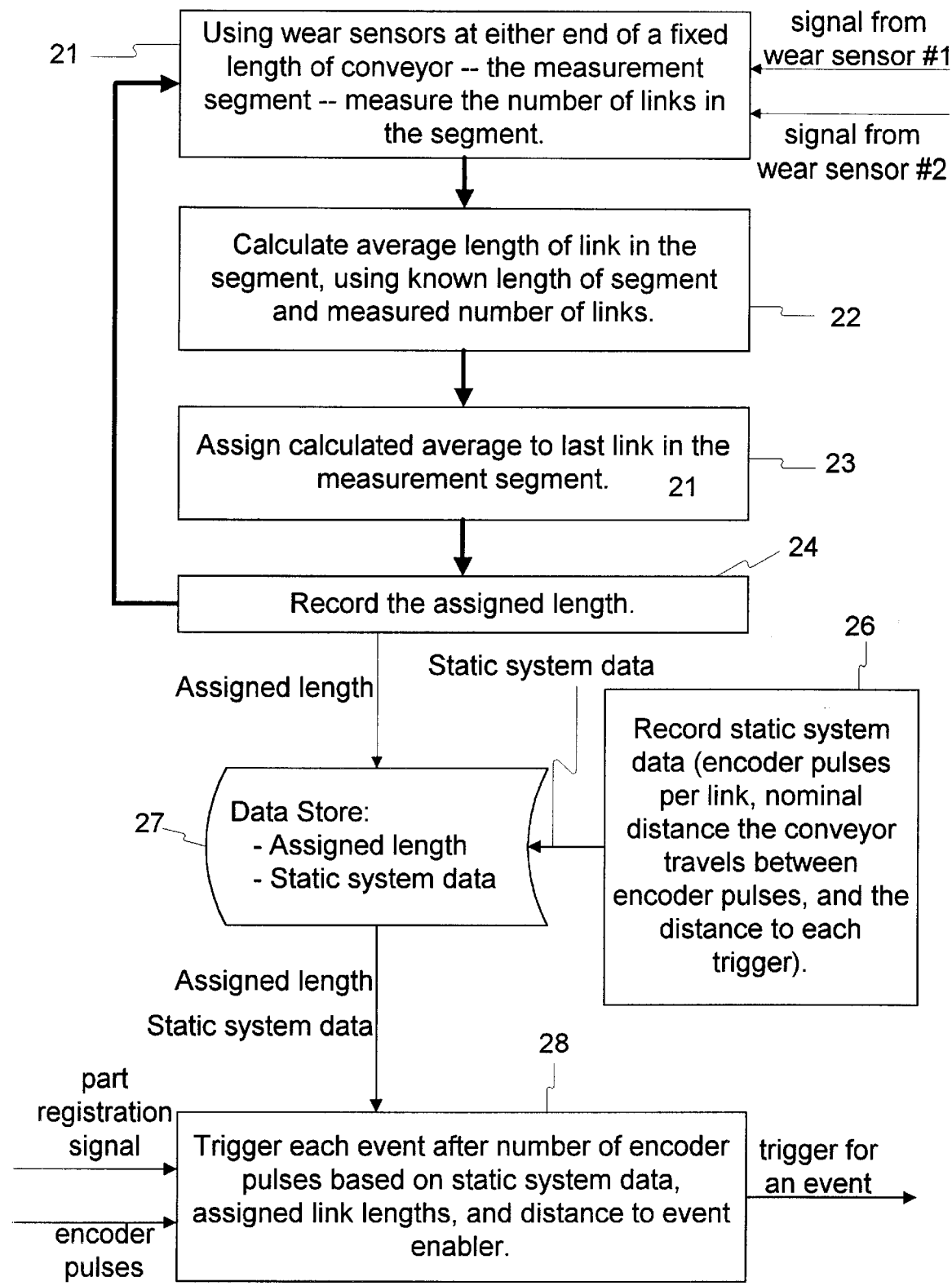
FIG. 2 is a flow chart of the method of the present invention.

Referring now to FIG. 2, the method for correcting for conveyor wear according to the present invention is depicted as a flow chart. First, the static system data is recorded. This data includes the encoder pulses per link, the nominal distance the conveyor travels between encoder pulses, and the distance from the part registration sensor to each event enabler.

Next, the assigned length for each link, in turn, is determined starting with the signals from the two wear sensors. The first step in this process is to measure the number of links in the measurement segment. Then the average length of a link in the measurement segment is calculated using the measured number of links and the known length of the measurement segment. This average length is assigned then to the last link in the measurement segment, closest to the downstream part registration sensor. This assigned length is recorded in place of any earlier assignment for that link. The assigned lengths calculated in this way and the static system data are available then to adapt when to trigger.

The triggering process is initiated by detecting a signal from the part registration sensor. The process concludes by issuing a a trigger for the event, after receiving a number of encoder pulses, the number being calculated based on the most recent assigned length of each link between the part registration sensor and the enabler for the particular event to be triggered.

The present invention can often provide a trigger that is five times as accurate as one provided by conventional encoder triggering. To show this, we first determine a general expression for an upper bound on the error (in determining when to trigger, or, equivalently, where the part is located on the conveyor) according to the present invention. Relative to a part registration sensor 14, the actual position of a part 16 attached to link n is:

$$\text{Actual} = \sum_{i=1}^{n} l_i$$

where $l_i$ is the actual (unknown) length of link i. The predicted position is based on the measured values:

$$\text{Predicted} = \sum_{i=1}^{n} m_i$$

$$= \sum_{i=1}^{i=n} \frac{1}{s}\sum_{j=o}^{s-1} l_{i+j}$$

$$= \sum_{i=1}^{s-1} \frac{1}{s}\sum_{j=i}^{s-1} l_i + \sum_{i=s}^{n} l_i + \sum_{i=1}^{s-1}\frac{1}{s}\sum_{j=1}^{i} l_{j+n}$$

$$= \sum_{i=1}^{s-1} \frac{il_i}{s} + \sum_{i=s}^{n} l_i + \sum_{i=1}^{s-1}\frac{s-i}{s} l_{i \times n}$$

The error is the difference:

$$= \sum_{i=1}^{s-1} \frac{il_i}{s} + \sum_{i=s}^{n} l_i + \sum_{i=1}^{s-1}\frac{s-i}{s}l_i + n - \sum_{i=1}^{n} l_i$$

$$= \sum_{i=1}^{s-1}\left(\frac{il_i}{s} - l_i\right) + \sum_{i=1}^{s-1}\frac{s-i}{s}l_{i+n}$$

$$= \sum_{i=1}^{s-1}\frac{i-s}{s}l_i + \sum_{i=1}^{s-1}\frac{s-1}{s}l_{i+n}$$

where the first summation contributes a negative value and the second summation is positive.

From this equation, the upper bound on the error (in where the part is located on the conveyor) may be computed by minimizing the first (always positive) sum and maximizing the second negative (always negative) sum. Assuming a minimum value of the link length $l_{min}$ and a maximum value $l_{max}$, we can substitute these values to obtain:

$$E_{UW} = \sum_{i=1}^{s-1}\left(\frac{i-s}{s}\right)l_{min} + \sum_{i=1}^{s-1}\left(\frac{s-i}{s}\right)l_{max}$$

$$= l_{min}\left(\frac{1-s}{2}\right) + l_{max}\left(\frac{s-1}{2}\right)$$

$$= (l_{max} - l_{min})\frac{s-1}{2}$$

Besides error stemming from conveyor wear, there is an additional source of error: the measurement of the phase lag, which will be accurate only to within one encoder pulse. This error is distributed among the s links in the measurement segment. Then in the present invention, the error from the phase lag measurement applied to a single link is:

$$E_{link} = \pm \frac{1}{s} l_p$$

where $l_p$ is the nominal distance the conveyor moves between encoder pulses. If there are m links between the part registration sensor and the trigger point, the total error due to encoder resolution is:

$$E_{resolution} = mE_{link} = \frac{\pm m}{s} l_p$$

Now the accuracy of the present invention can be compared with the accuracy of conventional (non-adaptive) encoder tracking. Assume a trigger point 4.5 m from the part registration sensor, with a nominal link length of 15 cm and a nominal encoder pulse length of 0.1 cm, all values that are realistic in actual manufacturing situations. Then the trigger point is, initially, 30 links downstream. With these parameters, the trigger based on traditional encoder tracking will always be signalled at a distance of:

$$t_{sig} = 30 \text{ links} \cdot 15 \text{ cm/link} = 4.50 \text{ m}$$

but in fact, due to wear causing each link to lengthen by 2.5 mm on average, the trigger should be signalled at:

$$t_{cor} = 30 \text{ links} \cdot 15.25 \text{ cm/link} = 4.57 \text{ m}$$

yielding an error of 7 cm, which can cause problems in actual manufacturing situations.

According to the method of the present invention, the value $t_{sig} = t_{cor}$ except for the error due to encoder resolution and the error in the wear correction. Using the above equation for the upper bound $E_{UW}$, and taking the measurement segment to comprise s=7 links, the two errors are at most:

$$E_{resolution} = (30/7) \cdot 0.10 \text{ cm} = 0.43 \text{ cm, and}$$

$$E_{UW} = (2.5 \text{ mm})(7-1)/2 = 0.75 \text{ cm}$$

Summing these two worst case errors results in a maximum error of 1.18 cm, an 83% reduction in the original 7 cm conveyor tracking error.

In another embodiment, it is possible for the wear sensors to be coupled to the conveyor so as to move as the chain lengthens, thereby always spanning a fixed number of links, instead of, as in the above embodiment, spanning a measurement segment of fixed length.

In yet another embodiment, instead of assigning a length to each new last link of the measurement segment, the present invention could be embodied to assign a stretch amount, and all calculations of when to trigger could be based on the stretch amount and a fixed, starting, nominal link length.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

Having disclosed the invention, what is claimed is:

1. An adaptive trigger for correcting for wear of a conveyor, comprising:

a) two wear sensors positioned a known distance apart along the conveyor to span a measurement segment of the conveyor, each wear sensor responsive to passage of a link, each for providing a pulse separated in time by a phase lag when a link passes;

b) a link measuring device, responsive to the pulse from each wear sensor, for providing an assigned link length signal for a last link in the measurement segment, the assigned link length equal to the total length of the measurement segment divided by the number of links in the measurement segment, the total length of the segment and the number of links in the measurement signal determined from the phase lag between pulses from the two wear sensors, the known distance separating the two wear sensors, and also a known nominal length of a link; and c) a trigger, responsive to the assigned link length signal for the last link in the measurement segment, for storing the assigned link length signal for that length and for storing similarly assigned link lengths for all other links in a trigger segment between a part registration sensor and a downstream triggering point, responsive to a signal from a part registration sensor indicating when the part is at the beginning of the trigger segment, and responsive to pulses from an encoder occurring at a fixed number per link, for providing a trigger signal for a downstream event enabler based on the most recent assigned link lengths, a stored nominal distance the conveyor travels between pulses of the encoder, and the stored length of the triggering segment, thereby continually adapting the trigger signal, by virtue of continual updates to the stored assigned link lengths, to account for wear of the conveyor.

* * * * *

UNITED STATES PATENT AND TRADEMARK OFFICE
CERTIFICATE OF CORRECTION

PATENT NO : 5,957,263
DATED : September 28, 1999
INVENTOR(S) : K. Espenschied

It is certified that error appears in the above-identified patent and that said Letters Patent is hereby corrected as shown below:

At col. 2, line 12, please cancel "Inks" and substitute --links-- therefor.

At col. 4, line 26, please cancel

"$= \sum_{i=1}^{i=n} \frac{1}{s} \sum_{j=o}^{s-1} l_{i+j}$" and substitute -- $= \sum_{i=1}^{n} \frac{1}{s} \sum_{j=o}^{s-1} l_{i+j}$ -- therefor;

at line 34, please cancel "$= \sum_{i=1}^{s-1} \frac{il_i}{s} + \sum_{i=s}^{n} l_i + \sum_{i=1}^{s-1} \frac{s-i}{s} l_{ixn}$"

and substitute -- $= \sum_{i=1}^{s-1} \frac{il_i}{s} + \sum_{i=s}^{n} l_i + \sum_{i=1}^{s-1} \frac{s-i}{s} l_{i+n}$ -- therefor;

UNITED STATES PATENT AND TRADEMARK OFFICE
CERTIFICATE OF CORRECTION

PATENT NO : 5,957,263
DATED : September 28, 1999
INVENTOR(S): K. Espenschied

It is certified that error appears in the above-identified patent and that said Letters Patent is hereby corrected as shown below:

at line 37, please insert --Error=Predicted-Actual--; and at line 40, please cancel "$= \sum_{i=1}^{s-1} \frac{il_i}{s} + \sum_{i=s}^{n} l_i + \sum_{i=1}^{s-1} \frac{s-i}{s} l_i + n - \sum_{i=1}^{n} l_i$"

and substitute -- $= \sum_{i=1}^{s-1} \frac{il_i}{s} + \sum_{i=s}^{n} l_i + \sum_{i=1}^{s-1} \frac{s-i}{s} l_{i+n} - \sum_{i=1}^{n} l_i$ -- therefor.

Signed and Sealed this

Twenty-second Day of August, 2000

Q. TODD DICKINSON

Attest:

Attesting Officer

Director of Patents and Trademarks